US006253078B1

(12) United States Patent
Lee

(10) Patent No.: US 6,253,078 B1
(45) Date of Patent: Jun. 26, 2001

(54) METHOD FOR PAGING HIGH-SPEED SUBSCRIBER BY ROAMING RESERVATION IN RADIO PAGING SWITCHING SYSTEM

(75) Inventor: Chang-Duk Lee, Kumi (KR)

(73) Assignee: SamSung Electronics Do., Ltd., Suwon (KR)

( * ) Notice: Subject to any disclaimer, the term of this patent is extended or adjusted under 35 U.S.C. 154(b) by 0 days.

(21) Appl. No.: 09/216,730

(22) Filed: Dec. 21, 1998

(30) Foreign Application Priority Data

Dec. 20, 1997 (KR) .................................................. 97-71363

(51) Int. Cl.[7] ........................................................ H04Q 7/20
(52) U.S. Cl. ........................ 455/426; 455/31.2; 455/31.3; 455/458
(58) Field of Search .................................. 455/426, 433, 455/31.2, 31.3, 458, 412, 413, 414, 502; 340/825.44

(56) References Cited

U.S. PATENT DOCUMENTS

| 5,039,984 | | 8/1991 | Andros et al. . | |
|---|---|---|---|---|
| 5,168,493 | * | 12/1992 | Nelson et al. ........................ | 455/38.1 |
| 5,537,407 | * | 7/1996 | Park et al. .......................... | 455/38.3 |
| 5,561,703 | * | 10/1996 | Arledge et al. ...................... | 455/31.2 |
| 5,574,771 | * | 11/1996 | Driessen et al. ..................... | 455/413 |
| 5,588,042 | * | 12/1996 | Comer .................................. | 455/413 |
| 5,600,312 | | 2/1997 | Willard et al. . | |
| 5,610,919 | | 3/1997 | Willard et al. . | |
| 5,625,351 | | 4/1997 | Willard et al. . | |
| 5,737,690 | * | 4/1998 | Gutman ............................... | 455/38.1 |
| 5,745,481 | | 4/1998 | Phillips et al. . | |
| 5,787,345 | | 7/1998 | Moon . | |
| 5,797,124 | * | 8/1998 | Walsh et al. ........................ | 704/275 |

* cited by examiner

Primary Examiner—Tracy Legree
(74) Attorney, Agent, or Firm—Robert E. Bushnell, Esq.

(57) ABSTRACT

A method for paging a high-speed subscriber by a roaming reservation in a radio paging switching system. The method includes the steps of registering a roaming area and a scheduled arrival time through a voice mail system; converting a format of the registered information and transmitting the registered information to the radio paging switching system; transmitting the registered information to a radio paging terminal so that the radio paging switching system can synchronize with the radio paging terminal in an area, a time and a frequency; and checking a timer of a corresponding area, and if a registered time elapses, storing, in a data base, information that a subscriber moves into the corresponding area, thus to provide the subscriber with a roaming service.

11 Claims, 7 Drawing Sheets

| SIGNAL CONTENTS | NOTE | |
|---|---|---|
| SOH | START OF HEADER | HEADER OF TNPP |
| DESTINATION ADDRESS | | |
| INERTIA | | |
| SOURCE ADDRESS | | |
| DATA PACKET SERIAL NUMBER | | |
| STX | START OF TEXT | |
| BLOCK TYPE | EXTENSION CAP PAGE FORMAT | |
| PAGE TYPE | FLEX TYPE | |
| PAGE CLASS | SECURE SIGNAL | |
| RF ZONE DESIGNATOR | RECEIVING FREQUENCY | |
| RF ZONE DESIGNATOR | | |
| FUNCTION CODE | | |
| MSN FLAG/ PRIORITY DESIGNATOR | | |
| CAPCODE | TERMINAL ADDRESS | |
| MSN | MESSAGE SEQUENCE NUMBER | |
| SECURE OPERATION CODE | | |
| NUMBER OF SEQUENTIAL REGISTRATION | | |
| START TIME | | |
| NUMMBER OF COVERAGE | | REPEAT BY NUMBER OF SWQUENTIAL REGISTRATION |
| DURATION TIME | | |
| OVERLAP TIME | | |
| SSID | | |
| FREQUENCY | | |
| ... | ... | |
| ETX | END OF TEXT | |
| CRC | CYCLIC REDUNDANCY CHECK CODE | |

(REPEAT BY NUMBER OF COVERAGE AREAS: NUMMBER OF COVERAGE, DURATION TIME, OVERLAP TIME, SSID, FREQUENCY)

FIG. 4

| SIGNAL CONTENTS | NOTE |
|---|---|
| SIGNAL ID | |
| SUBSCTIBER NUMBER LENGTH | DDHHMM |
| SUBSCRIBER NUMBER | 8 DIGITS |
| START TIME | |
| NUMBER OF SEQUENTIAL REGISTRATION | |
| NUMBER OF COVERAGE AREAS | |
| DURATION TIME | DDHHMM |
| AREA NUMBER | |

| AREA NUMBER | SSID |
|---|---|
| 1 | xxxx |
| 2 | yyyy |
| 3 | zzzz |
| . | . |
| . | . |
| . | . |
| n−1 | aaaa |
| n | bbbb |

FIG. 7

| AREA NUMBER | FREQ. VALUE | | NOTE |
|---|---|---|---|
| 1 | RF | VAL(Hz) | |
| | 0 | 163.125 | |
| | 1 | . | |
| | . | . | |
| | 79 | . | |
| 2 | OWN_SYSTEM | | |
| 3 | RF | VAL(Hz) | |
| | 0 | 163.125 | |
| | 1 | . | |
| | . | . | |
| | 79 | . | |
| 4 | RF | VAL(Hz) | |
| | 0 | 163.125 | |
| | 1 | . | |
| | . | . | |
| | 79 | . | |
| . | . | | |
| . | . | | |
| . | . | | |
| . | . | | |
| . | . | | |
| n-1 | . | | |
| n | . | | |

FIG. 8

METHOD FOR PAGING HIGH-SPEED SUBSCRIBER BY ROAMING RESERVATION IN RADIO PAGING SWITCHING SYSTEM

CLAIM OF PRIORITY

This application makes reference to, incorporates the same herein, and claims all benefits accruing under 35 U.S.C §119 from an application entitled Method For Paging High-Speed Subscriber By Roaming Reservation In Radio Paging Switching System earlier filed in the Korean Industrial Property Office on Dec. 20, 1998, and there duly assigned Serial No. 97-71363 by that Office.

BACKGROUND OF THE INVENTION

1. Field of the Invention

The present invention relates to a method for paging a high-speed subscriber in a radio paging switching system, and more particularly, to a method for paging a high-speed subscriber by a roaming reservation.

2. Description of the Related Art

A radio paging switching system has provided paging subscribers with low-speed paging service using POCSAG-512 bps or POCSAG-1200 bps. Such a radio paging switching system can offer a wide area network radio paging service, a roaming service for example. The roaming service is a function for providing a communication service for a paging subscriber, or terminal subscriber, moving into an area belonging to another mobile communication system. For this, the mobile communication system which is requested to provide the communication service receives information about the terminal subscriber from a mobile communication system in which the terminal subscriber has originally been registered.

A public switched telephone network (PSTN) provides a telephone service for a caller who attempts to call a radio paging terminal by using a telephone. A radio paging switching system connected to the PSTN performs a paging service. A paging call processor judges whether a current call is a call for a low-speed subscriber or for a Flex™ (a paging protocol by Motorola which will be referred to hereafter as: flex) high-speed subscriber and processes a corresponding paging call. A base station interface controls a plurality of base stations and transmits radio paging data thereto. A wide area call processor receives a wide area call from the paging call processor to transmit a message and subscriber information to all registered areas, and receives a wide area call message from a wide area network to detect a radio frequency (RF) channel number. If there is a radio paging terminal corresponding to the detected RF channel number, the wide area call processor requests the paging call processor to process the wide area call. The low-speed base stations each transmit radio paging data to a plurality of low-speed transmitters, and control and monitor the transmitters. If a radio paging terminal roams into an area where it is not registered, it should sense its position. For example, if the radio paging terminal visits another area, it automatically senses its position by connecting an area recognition code using a reference frequency band of that area. Once the position is sensed, the radio paging terminal should inform the radio paging switching system of its position. To register the position of the radio paging terminal, the subscriber can register an area code by a direct connection with the paging call processor by a dual tone multifrequency (DTMF) signal using the telephone. If the subscriber roams to another area from a newly registered area, he should again register the roaming area. Therefore, it is inconvenient to register corresponding areas every time the subscriber roams.

Utilization of wireless terminals and the compensation for roaming are taught by the following U.S. patents: U.S. Pat. No. 5,039,984 to Andrew A. Andros et al. entitled Paging Receiver With Programmable Areas Of Reception; U.S. Pat. No. 5,561,703 to Cathy L. Arledge et al. entitled System And Method For Integration Of A Paging Server Into A Private Branch Exchange Environment; U.S. Pat. No. 5,600,312 to David F. Willard et al. entitled Message System And Method Having Roaming Capability And Controlled Group Messaging; U.S. Pat. No. 5,610,919 to David F. Willard et al. entitled Network Identification Information Placement Architecture For Messaging System Having Roaming Capability; U.S. Pat. No. 5,625,351 to David F. Willard et al. entitled Messaging System Having Roaming Capability; U.S. Pat. No. 5,745,481 to W. Garland Phillips et al. entitled Message System And Method For Efficient Multi-Frequency Roaming; and U.S. Pat. No. 5,787,345 to Billy G. Moon entitled Automatic Voice Prompts In A Land Mobile Radio System.

SUMMARY OF THE INVENTION

It is an object of the present invention to provide a method for paging a high-speed subscriber by previously registering roaming areas through a VMS in a radio paging switching system.

To achieve the above and other objects of the present invention, there is provided a method for paging a high-speed subscriber by a roaming reservation in a radio paging switching system having a voice mail system. The method includes the steps of: registering a roaming area and a scheduled arrival time through the voice mail system; converting a format of the registered information and transmitting the registered information to the radio paging switching system; transmitting the registered information to a radio paging terminal so that the radio paging switching system can synchronize with the radio paging terminal in an area, a time and a frequency; and checking a timer of a corresponding area, and if a registered time elapses, storing, in a data base, information that a subscriber moves into the corresponding area, thus to provide the subscriber with a roaming service.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 4 shows a Telecator Network Paging Protocol format for synchronizing time and an area between a radio paging switching system and a radio paging terminal according to the principles of the present invention;

FIG. 7 shows an area ID management table for changing an area number into a Single Simulcast System Identification according to the principles of the present invention; and FIG. 8 shows a frequency management table for managing a frequency value of an RF channel with respect to each area number according to the principles of the present invention.

DETAILED DESCRIPTION OF THE PREFERRED EMBODIMENT

Figure 1:
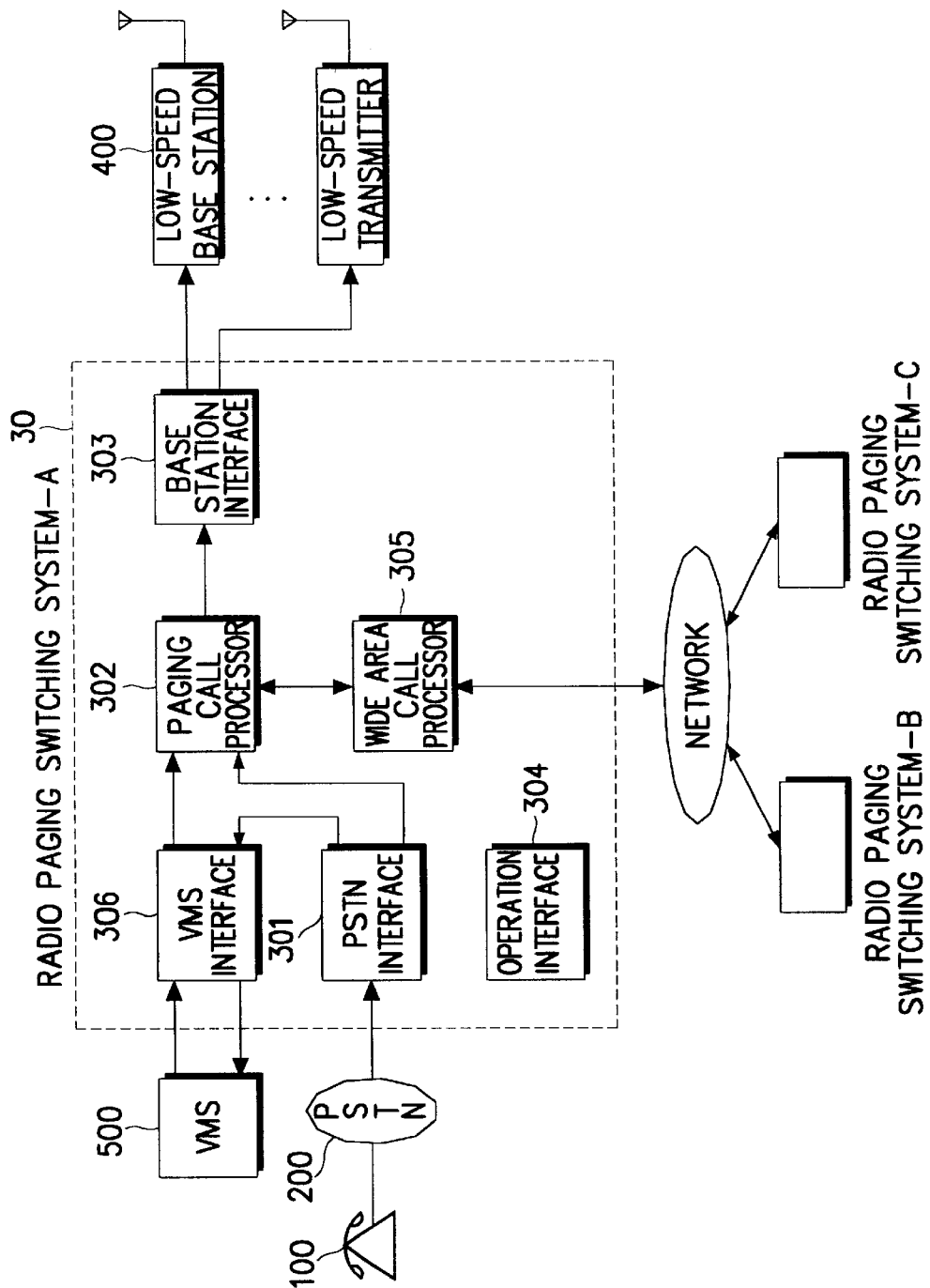
FIG. 1 is a block diagram of a switching network for a wide area network radio paging service.

FIG. 1 shows a structure of a switching network for a wide area network radio paging service. A public switched telephone network (PSTN) 200 provides a telephone service for a caller who attempts to call a radio paging terminal by using a telephone 100. A radio paging switching system 30 connected to the PSTN 200 performs a paging service. A PSTN interface 301 connected to the PSTN 200 receives an incoming call. A paging call processor 302 judges whether a current call is a call for a low-speed subscriber or for a flex high-speed subscriber and processes a corresponding paging call. A base station interface 303 controls a plurality of base stations 400 and transmits radio paging data thereto. An operation interface 304 is a module for managing and monitoring the radio paging switching system 30. A wide area call processor 305 receives a wide area call from the paging call processor 302 to transmit a message and subscriber information to all registered areas, and receives a wide area call message from a wide area network to detect a radio frequency (RF) channel number. If there is a radio paging terminal corresponding to the detected RF channel number, the wide area call processor 305 requests the paging call processor 302 to process the wide area call. A voice mail system (VMS) interface 306 connected to the paging call processor 302 and the PSTN interface 301 transmits a voice signal received from a subscriber to a VMS 500, and enables a voice announcement (prompt) or a voice message signal reproduced from the VMS 500 to be sent to a caller. The low-speed base stations 400 each transmit radio paging data to a plurality of low-speed transmitters 401, and control and monitor the transm tters 401. The VMS 500 provides a function menu according to a scenario given to a subscriber through the voice announcement, and provides a voice recording and reproducing service, a radio paging service, and a supplementary service such as a wide area select function.

If a radio paging terminal roams into an area where it is not registered, it should sense its position. For example, if the radio paging terminal visits another area, it automatically senses its position by connecting an area recognition code using a reference frequency band of that area. Once the position is sensed, the radio paging terminal should inform the radio paging switching system of its position. To register the position of the radio paging terminal, a wide area subscriber presses a radio paging number by using the telephone 100. Then the subscriber is connected to the VMS 500 through the PSTN 200. The VMS 500 sends a voice announcement to the subscriber. The subscriber presses a code of a roaming area according to the voice announcement. The area code is transmitted to the paging call processor 302 through the VMS interface 306 and stored in a data base. However, if the subscriber does not use the VMS 500, he can register an area code by a direct connection with the paging call processor 302 by a dual tone multifrequency (DTMF) signal using the telephone 100.

If the subscriber roams to another area from a newly registered area, he should again register the roaming area. Therefore, it is inconvenient to register corresponding areas every time the subscriber roams.

Figure 2:
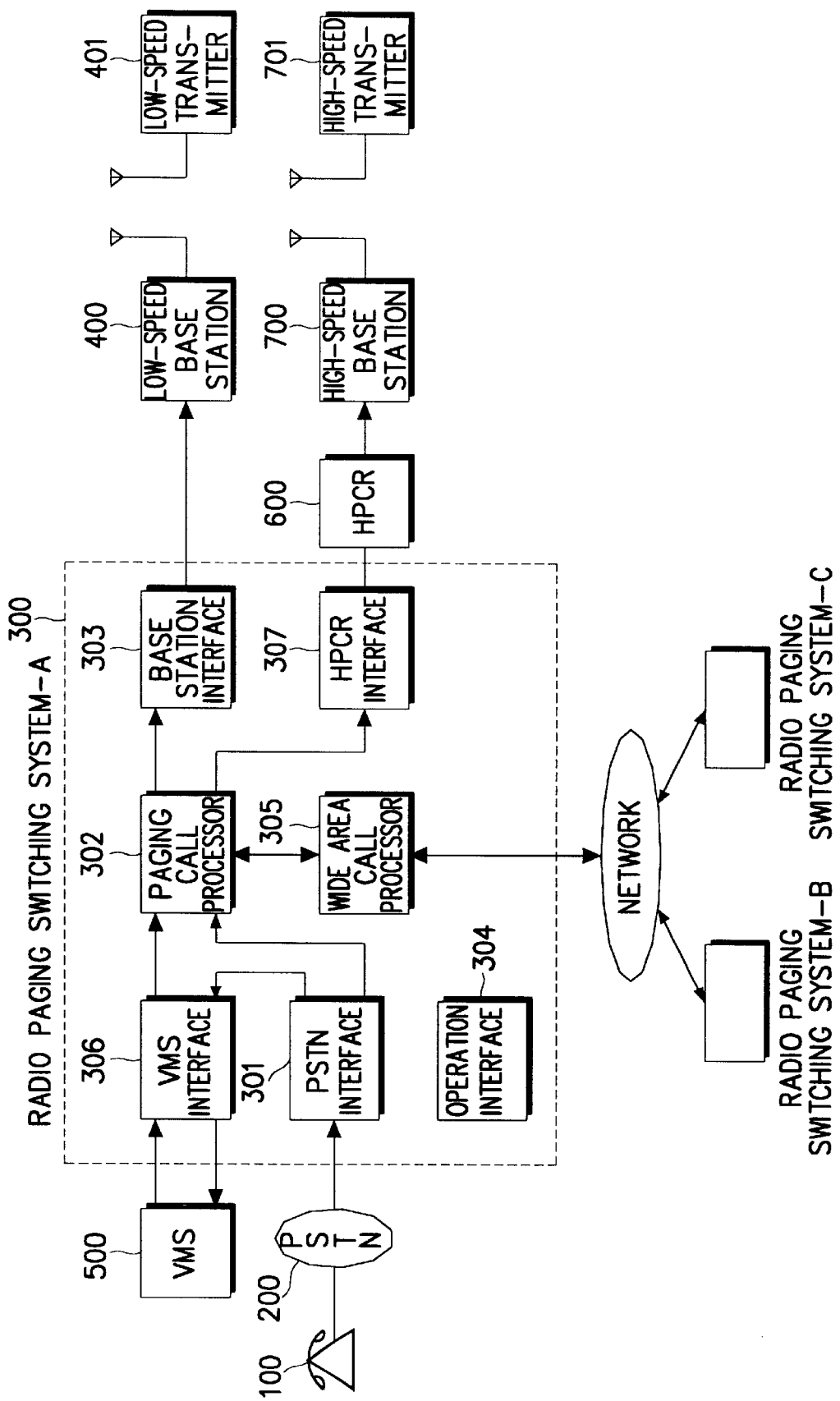
FIG. 2 is a block diagram of a radio paging switching network according to the principles of the present invention.

A radio paging switching network shown in FIG. 2 further includes, an HPCR (High Performance Paging Control Rack) interface 307, an HPCR 600, a high-speed base station 700, and a plurality of high-speed transmitters 701, in addition to the switching network shown in FIG. 1. The HPCR interface 307 transmits to the HPCR 600 a call using a high-speed paging function out of calls processed in a radio paging switching system 300. The HPCR interface 307 uses TNPP (Telecator Network Paging Protocol) Version 3.7 as protocol standard. Paging data includes a frequency number at which a radio paging terminal should be tuned, a CAP code, a function code, a page type, a page class, and a receiving message. The HPCR 600 codes paging data received through the TNPP to flex receiving protocol and transmits the coded data to the high-speed base station 700. The high-speed base station 700 transmits the coded radio paging data to the high-speed transmitters 701. The high-speed transmitters 701 page the radio paging terminal by the flex protocol.

A preferred embodiment of the present invention will be described hereinafter with reference to FIGS. 2 to 8.

For a roaming service, high-speed subscribers should be registered. The operation interface 304 receives a CAP code of a high-speed subscriber, a frame number, a page collapse number, a phase number, and other general information and saves those in a hard disk and a memory of the radio paging switching system 300. The frame number is stored in a buffer D__Pval (not shown). The collapse number and the phase number are stored in a buffer D__QRval (not shown). Low-speed subscribers can also be registered. In this case, only a CAP code and other general information are saved.

If such information is registered, a wide area class is assigned to a specific flex subscriber through the operation interface 304 and the flex subscriber can use the VMS 500.

Figure 3:
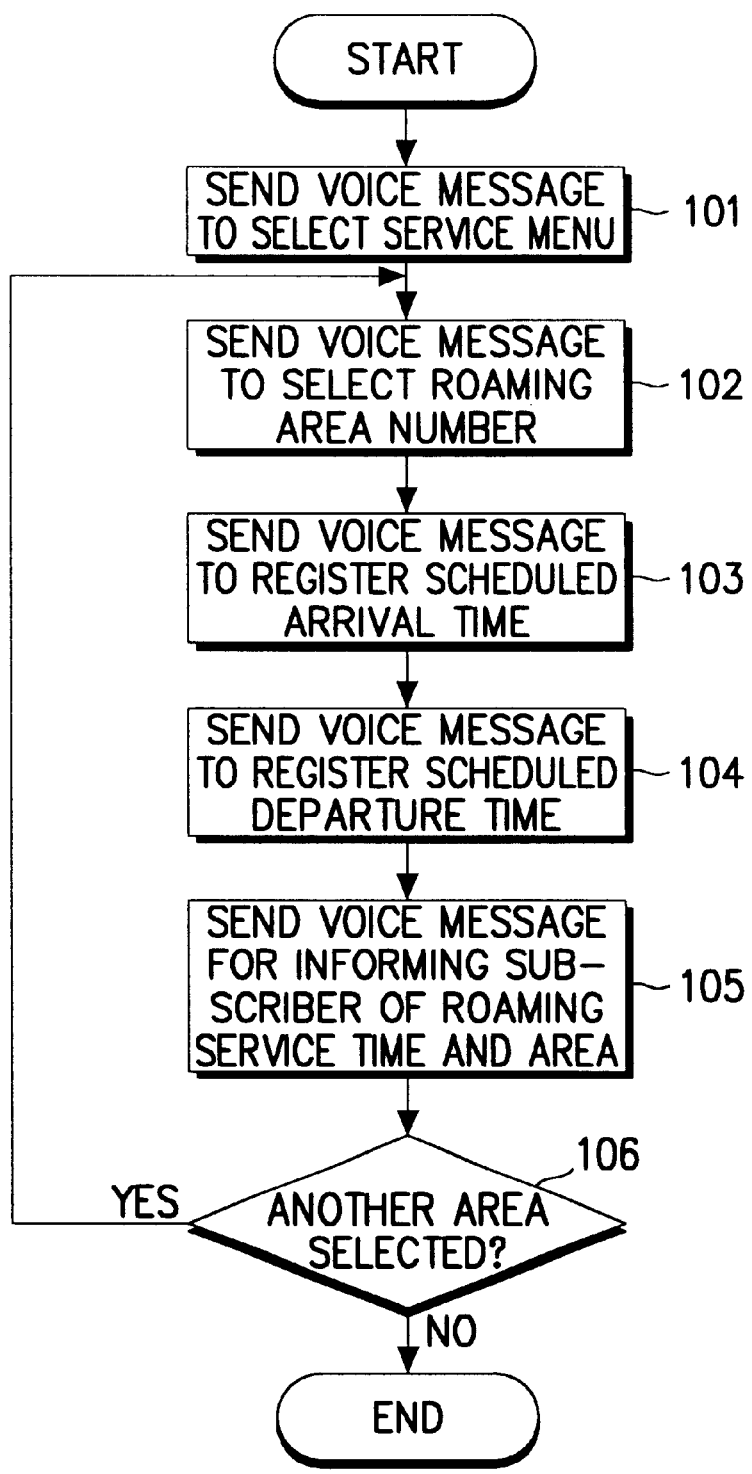
FIG. 3 is a flow chart showing an operation process for registering a roaming area and time according to the principles of the present invention.
Figures 5, 6:
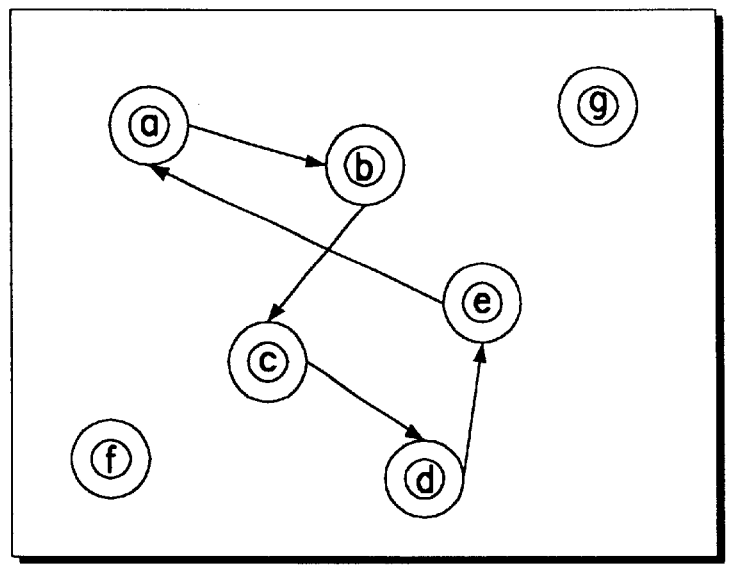
FIG. 5 shows an example of a sequential roaming area registration according to the principles of the present invention.
FIG. 6 shows a signal format of roaming registration information according to the principles of the present invention.

Referring to FIG. 3, there is shown an operation process for registering a roaming area and time. If a subscriber (user of a radio paging terminal) calls the radio paging switching system 300 by using the telephone 100 in order to reserve a roaming service, the PSTN interface 301 senses this and connects a call to the VMS 500 through the VMS interface 306. The VMS 500 sends a voice message indicating that a call has been connected and sends a voice message directing the subscriber to select a service menu at step 101. If the subscriber selects a roaming service menu, the VMS 500 sends a voice message directing the subscriber to select a roaming area number at step 102. If the subscriber selects a roaming area number, the VMS 500 sends a voice message directing the subscriber to register a scheduled arrival time at step 103. If the subscriber selects a scheduled arrival date, hour and minute (DDHHMM), the VMS 500 sends a voice message directing the subscriber to register a scheduled departure time from a roaming area at step 104. If it is registered, the VMS 500 sends a voice message that a roaming service will be provided for the subscriber from DDHHMM to DDHHMM in a specific area, at step 105. The VMS 500 checks at step 106 whether another area is selected by sending a voice message to ask the subscriber whether he will select another area. If another area is selected, the above operations are repeated. Various areas may be sequentially registered in order of time, for example (a)→(b)→(c)→(d)→(e)→(a), as shown in FIG. 5. If another area is not selected at step 106, the operation process is ended.

If the roaming area and time are registered, the VMS 500 converts the registered information into a signal format shown in FIG. 6 and transmits the registered information to the paging call processor 302 through the VMS interface 306. The paging call processor 302 stores information regarding the subscriber who has registered the roaming area and time as a wide area registration subscriber in the data base, and transmits the roaming area and time to the HPCR interface 307 by the signal format shown in FIG. 6 in order to synchronize with the radio paging terminal in time. The HPCR interface 307 packing-processes the received information into the TNPP signal format shown in FIG. 4 and transmits the processed information to the HPCR 600. In FIG. 4, information about a SSID (Single Simulcast System Identification) and a frequency are obtained from an area ID management table shown in FIG. 7 and a frequency value management table shown in FIG. 8, respectively. These tables are managed by the operation interface 304 and may be altered. If the HPCR 600 transmits the registered information to the radio paging terminal through the high-speed base station 700, the radio paging terminal stores the received information in a memory. In order to monitor the time of each of sequentially registered areas, a timer of the radio paging terminal starts to operate to synchronize time for a roaming area between the radio paging switching system 300 and the radio paging terminal. If the time for each roaming area indicates a registered time, the radio paging terminal is tuned at a frequency of a corresponding area shown in FIG. 4 and becomes a ready state for a wide area call. Similarly, a timer of the radio paging switching system 300 operates. If the time for each roaming area indicates the registered time, the radio paging switching system 300 stores information that the subscriber moves into a corresponding area in the data base. An overlap time is applied to the subscriber in areas to depart and to visit, thereby providing a roaming service during a time gap. For roaming processing, a wide area call processing signal is transmitted to, for example, a radio paging switching system B from the radio paging switching system 300.

As described above, since the roaming area is previously registered through the VMS, the roaming service can be provided in a corresponding area. If various roaming areas are sequentially registered in advance, the sequential roaming services for those areas are offered.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for paging a high-speed subscriber by a roaming reservation in a radio paging switching system having a voice mail system, comprising the steps of:

registering a roaming area and a scheduled arrival time through said voice mail system in response to voice messages from a subscriber of a radio paging terminal;

converting the registered information into a desired signal format and transmitting the registered information in said desired signal format from said voice mail system to said radio paging switching system;

transmitting the registered information from said radio paging switching system to said radio paging terminal so that said radio paging switching system can synchronize with said radio paging terminal according to time;

checking a timer of said radio paging terminal, and if a registered time elapses, and tuning said radio paging terminal at a frequency of said roaming area for readying said radio paging terminal for a wide area call; and checking a timer of said radio paging switching system, and if the registered time elapses, said storing information that the subscriber moves into said roaming area in a data base of said radio paging switching system to provide said subscriber with a roaming service.

2. The method as claimed in claim 1, wherein said registering step comprises the steps of:

selecting a service menu in response to a first voice prompt message sent from said voice mail system to said subscriber via a telephone;

selecting a roaming area number in response to a second voice prompt message, if the selected service menu is a roaming service menu is selected;

registering a scheduled arrival time of a roaming area in response to a third voice prompt message; and registering a scheduled departure time from said roaming area in response to a fourth voice prompt message.

3. The method as claimed in claim 2, further comprising a step of said voice mail system audibly informing said subscriber which roaming area and roaming service time has been selected.

4. The method as claimed in claim 3, further comprising a step of sending another voice prompt message to said subscriber asking whether said subscriber desires to select another area after informing said subscriber which roaming area and roaming service time has been selected, and, if another area is selected, returning to said step of selecting a roaming area number.

5. The method as claimed in claim 1, wherein said step of transmitting the registered information from said radio paging switching system to a radio paging terminal comprises converting said registered information from said desired format into a Telecator Network Paging Protocol format for transmission to said radio paging terminal.

6. The method as claimed in claim 1, wherein said step of transmitting the registered information from said radio paging switching system to a radio paging terminal comprises utilizing a high performance paging control rack interface to convert said registered information from said desired format into a Telecator Network Paging Protocol format for transmission to said radio paging terminal via a high performance paging control rack and a high-speed base station.

7. A paging system comprising:

a voice mail system;

a radio paging switching system comprising:

a voice mail system interface for interfacing with said voice mail system;

a public switched telephone network interface for interfacing with a telephone via a public switched telephone network;

a paging call processor for determining whether a current call is a call for a low-speed subscriber or for a Flex™ high-speed subscriber and processing a corresponding paging call;

a base station interface for interfacing said radio paging switching system with a low-speed base station;

a high performance paging control rack interface for interfacing said radio paging switching system with a high performance paging control rack; and a wide area call processor for transmitting a message and subscriber information to all registered areas, and for receiving a wide area call message from a wide area network to detect a radio frequency channel number;

said high performance paging control rack for coding paging data to Flex™ receiving protocol;

a high-speed base station for receiving the Flex™ receiving protocol coded data and transmitting the Flex™ receiving protocol coded paging data to a high-speed transmitter; and said high-speed transmitter paging a radio paging terminal by the Flex™ receiving protocol.

8. The paging system as set forth in claim 7, further comprising:

said voice mail system transmitting voice prompts to a subscriber of said radio paging terminal and registering a roaming area and a scheduled arrival time in response to voice messages from said subscriber.

9. The paging system as set forth in claim 8, further comprising:

said voice mail system converting the registered information into a desired signal format and transmitting the registered information in said desired signal format via said voice mail system interface to said paging call processor.

10. The paging system as set forth in claim 9, further comprising:

said paging call processor storing information regarding the subscriber who has registered the roaming area and time as a wide area registration subscriber in a data base, and transmitting the roaming area and time to the high performance paging control rack interface.

11. The paging system as set forth in claim 9, further comprising:

said high performance paging control rack interface converting said registered information from said desired format into a Telecator Network Paging Protocol format for transmission to said high performance paging control rack.

* * * * *